US011040693B2

(12) United States Patent
Umezawa et al.

(10) Patent No.: US 11,040,693 B2
(45) Date of Patent: Jun. 22, 2021

(54) VEHICULAR PROTECTION DEVICE AND VEHICLE

(71) Applicant: HONDA MOTOR CO., LTD., Tokyo (JP)

(72) Inventors: Masaki Umezawa, Wako (JP); Hiroyuki Asanuma, Wako (JP); Yasuaki Gunji, Wako (JP); Osamu Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 16/530,070

(22) Filed: Aug. 2, 2019

(65) Prior Publication Data

US 2020/0047708 A1 Feb. 13, 2020

(30) Foreign Application Priority Data

Aug. 7, 2018 (JP) .............................. JP2018-148227

(51) Int. Cl.
*B60R 21/36* (2011.01)
*B60R 21/0134* (2006.01)
*B60W 30/08* (2012.01)
*B60R 21/38* (2011.01)

(52) U.S. Cl.
CPC .......... *B60R 21/36* (2013.01); *B60R 21/0134* (2013.01); *B60R 21/38* (2013.01); *B60W 30/08* (2013.01)

(58) Field of Classification Search
CPC ..... B60R 21/36; B60R 21/0134; B60R 21/38; B60W 30/08
See application file for complete search history.

(56) References Cited

U.S. PATENT DOCUMENTS

| 6,329,910 | B1* | 12/2001 | Farrington | ............ | G01P 15/122 |
| | | | | | 340/436 |
| 7,415,337 | B2* | 8/2008 | Hau | ........................ | B60R 21/34 |
| | | | | | 180/274 |
| 9,956,938 | B2* | 5/2018 | Abe | ........................ | B60R 21/38 |
| 2006/0213714 | A1* | 9/2006 | Igawa | ................. | B60R 21/0134 |
| | | | | | 180/274 |

(Continued)

FOREIGN PATENT DOCUMENTS

| JP | 2006-044325 A | 2/2006 |
| WO | 2017056381 A1 | 4/2017 |

*Primary Examiner* — Darlene P Condra
(74) *Attorney, Agent, or Firm* — Rankin, Hill & Clark LLP

(57) ABSTRACT

A vehicular protection device includes a protection device that protects a protection target that comes into collision with a vehicle, a measuring device that captures an image of the protection target and measures a distance between the protection target and the vehicle, and a controller that activates the protection device in different modes based on whether the protection target includes a predetermined vehicle on which to ride. The protection device includes an airbag device that deploys an airbag toward a front of the vehicle, and a pop-up device that moves a hood provided in a front upper section of the vehicle, and the controller activates the pop-up device without activating the airbag device if the protection target includes the vehicle on which to ride, and activates the airbag device and the pop-up device if the protection target does not include the vehicle on which to ride.

10 Claims, 11 Drawing Sheets

(56) References Cited

U.S. PATENT DOCUMENTS

| | | | |
|---|---|---|---|
| 2013/0184940 A1* | 7/2013 | Stoll | B60R 21/01 |
| | | | 701/45 |
| 2015/0224956 A1* | 8/2015 | Takenaka | B60R 21/38 |
| | | | 73/862.381 |
| 2017/0182961 A1* | 6/2017 | Wu | B60R 21/36 |
| 2017/0182970 A1* | 6/2017 | Wu | B60R 21/36 |
| 2017/0282847 A1* | 10/2017 | Jenny | B60R 21/38 |
| 2018/0194315 A1* | 7/2018 | Wakabayashi | B60R 21/36 |

* cited by examiner

VEHICULAR PROTECTION DEVICE AND VEHICLE

CROSS-REFERENCE TO RELATED APPLICATION

This application is based upon and claims priority from the Japanese Patent Application No. 2018-148227, filed on Aug. 7, 2018, the entire contents of which are incorporated herein by reference.

BACKGROUND OF THE INVENTION

1. Field of the Invention

The present invention relates to a vehicular protection device and a vehicle adapted to protect a protection target such as a pedestrian, depending on the protection target when the vehicle collides with the protection target.

2. Description of the Related Art

For example, vehicular protection devices disclosed in Japanese Unexamined Patent Application Publication No. 2006-044325 (Patent document 1) and International Publication No. 2017/056381 (Patent document 2) have been known as a vehicular protection device adapted to mitigate impact on a protection target (a pedestrian or the like) by deploying an airbag in the event of a collision between a vehicle and the protection target. The vehicular protection device disclosed in Patent document 1 prevents a pedestrian from sliding backward and upward over the vehicle by deploying the airbag with an upward slide preventive means upward from a front bumper in the event of a collision. The damage reduction system disclosed in Patent document 2 absorbs impact on a pedestrian using a hood (bonnet) and an airbag deployed over a front windshield, and then prevents the pedestrian from falling from the hood by accelerating, decelerating and steering a vehicle while detecting the behavior of the pedestrian on the hood with a camera.

The protection target described above may be not merely a pedestrian, but also, for example, a cyclist riding a bicycle. Since the position of the center of gravity of the cyclist riding the bicycle or the like is higher than that of a general pedestrian, the behavior of the cyclist who has collided with a vehicle is different from that of the general pedestrian. For this reason, configuring the vehicular protection device on the assumption that a protection target is only a general pedestrian may fail to protect the protection target appropriately.

The present invention has therefore been made in view of the above problems, and an object of the invention is to provide a vehicular protection device and a vehicle that are capable of appropriately protecting a protection target when the protection target collides with the vehicle.

SUMMARY OF THE INVENTION

In order to solve the above problems, according to an aspect of the present invention, a vehicular protection device reflecting one aspect of the present invention includes: a protection device that protects a protection target that comes into collision with a vehicle; a measuring device that captures an image of the protection target and measures a distance between the protection target and the vehicle; and a controller that activates the protection device in different modes based on whether the protection target includes a predetermined vehicle on which to ride.

The vehicular protection device according to one aspect of the present invention makes it possible to appropriately protect a protection target when the protection target collides with the vehicle.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE EMBODIMENTS

Configuration of Embodiment

Embodiments of the present invention will be hereinafter described in detail with reference to the accompanying drawings depending on the necessity.

Figure 1:
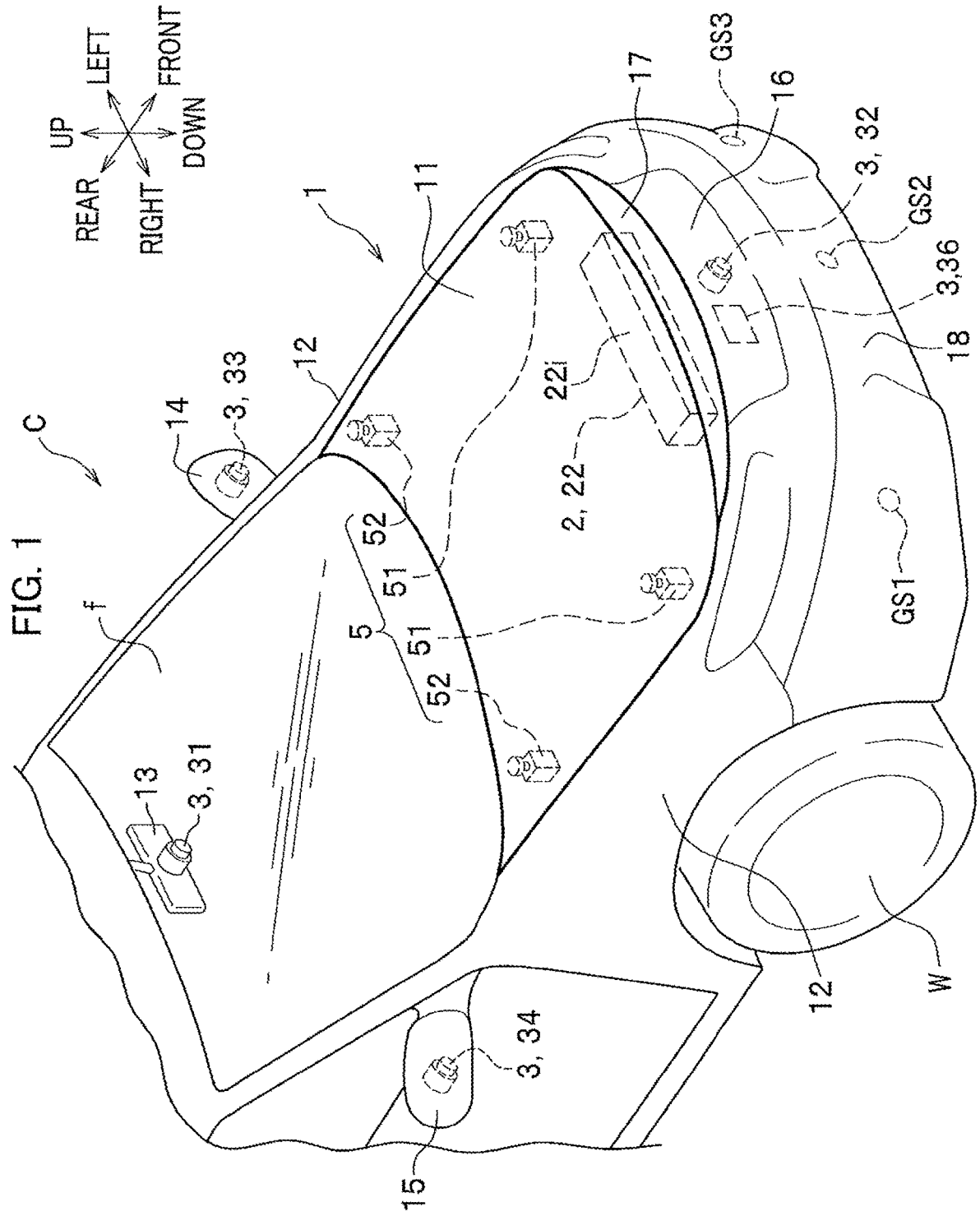
FIG. 1 is a main part schematic perspective view illustrating an example of a vehicular protection device according to an embodiment of the present invention.

FIG. 1 is a main part schematic perspective view illustrating an example of a vehicular protection device 1 according to an embodiment of the present invention, and shows how a front section of the vehicle looks while in a normal state. The vehicular protection device according to the embodiment is a device for protecting a pedestrian, a bicycle and/or the like that has collided with a vehicle. Incidentally, "front" is defined as a position that is in the direction in which the vehicle C runs forward; "rear" is defined as a position that is in the direction in which the vehicle C runs backward; "up" is defined as toward a higher position that is in a vertical direction; "down" is defined as toward a lower position that is in the vertical direction; and "left" and "right" are defined as left and right from the vehicle C in a width direction of the vehicle C.

<Vehicle C>

To begin with, descriptions will be provided for the vehicle C to which the vehicular protection device 1 is applied.

As illustrated in FIG. 1, the vehicle C to which the vehicular protection device 1 according to the present invention is applied may be a bonnet-type vehicle having a hood 11 in the front side of its vehicle body. It does not matter whether the vehicle C is a passenger car or a work vehicle. The vehicle type is not limited to a specific one. The following descriptions will be provided using a passenger car having a motor room in the front side of its vehicle body as an example of the vehicle C.

The vehicle C includes, for example, a hood 11, fenders 12, a rear-view mirror 13, door mirrors 14, 15, a hood grille 16, a hood edge cover 17, a front bumper 18 (front end section). The vehicle C further includes: an airbag device 2 (a protection device) provided under the front side of the hood 11; and a pop-up device 5 (a protection device) provided in four lower corners of the hood 11.

The airbag device 2 and the pop-up device 5 are protection devices for protecting a pedestrian, a bike cyclist or the like when the pedestrian, the cyclist or the like collides with the vehicle C. The pedestrian and the like to be protected will be hereinafter referred to as "protection targets." In the embodiment, protection targets can be roughly classified into a "pedestrian" and an "aggregation of a cyclist and a vehicle on which to ride" (hereinafter simply referred to as an "aggregation"). Furthermore, examples of the vehicle on which to ride include a bicycle, a tricycle and a motorcycle.

The collection of the airbag device 2, the pop-up device 5, their controller, and the like (although discussed in detail later) will be referred to as the "vehicular protection device 1." The pop-up device 5 pushes the hood 11 upward in the event of the collision of the protection target with the vehicle C. Thus, when the protection target hits the hood 11, the hood 11 is deformed to absorb collision load, and mitigates impact on the protection target. The pop-up device 5 includes a front pop-up device 51, and a rear pop-up device 52. The front pop-up device 51 is arranged on the front side of the hood 11, and pushes the front side of the hood 11 upward. The rear pop-up device 52 is arranged on the rear side of the hood 11, and pushes the rear side of the hood 11 upward.

The hood 11 includes a hood skin, and a hood frame. In this respect, the hood skin is a plate member forming an upper surface of the hood 11 illustrated. Meanwhile, the hood frame is a member (whose illustration is omitted), fixed to a lower surface of the hood 11, for supporting the hood skin from under. It is desirable that the hood skin be made from a member that is capable of softly catching a pedestrian when a collision of the vehicle C with the pedestrian bounces the pedestrian onto the hood 11. More specifically, it is desirable that the hood skin be made from a plate member that is soft and elastic enough to be curved and deformed when pressed with a predetermined or larger load.

The fenders 12 are arranged in the left and right of the hood 11, and covers front wheels W from above. The rear-view mirror 13 is a room mirror provided at an upper front end of the inside of a vehicle compartment. The door mirrors 14, 15 are mirrors provided at upper front ends of the left and right doors, respectively. The hood grille 16 is a member, provided near a front end of the vehicle C, for: taking in external air via a front end part of the vehicle; and guiding the external air to a radiator (whose illustrating is omitted). The hood grille 16 includes multiple substantially plate-shaped wind guide plates extending in the vehicle width direction, and arranged in parallel to one another at appropriate intervals in the up-down direction. A camera 32 is arranged behind the hood grille 16 with a space between the camera 32 and the hood grille 16. The front bumper 18 is a member arranged on a front end edge of the vehicle C, and protects the vehicle C by being deformed during a collision. Three acceleration sensors GS1, GS2, GS3 are embedded in the front bumper 18.

The hood edge cover 17 is provided between the hood 11 and the hood grille 16. The hood edge cover 17 is a panel member to be pushed upward and opened by the deployment of an airbag module 22 arranged under the hood edge cover 17. The hood edge cover 17 includes a steel plate and the like that extend along a distal end part of the hood 11 in the vehicle width direction.

The hood edge cover 17 is turnably supported such that when an airbag 21 (see FIG. 2A) is deployed, the hood edge cover 17 is pushed upward and turned by the airbag 21 to set the airbag 21 free. Incidentally, the mechanism for opening the hood edge cover 17 may be changed depending on the necessity.

<Vehicular Protection Device 1>

Figure 2A:
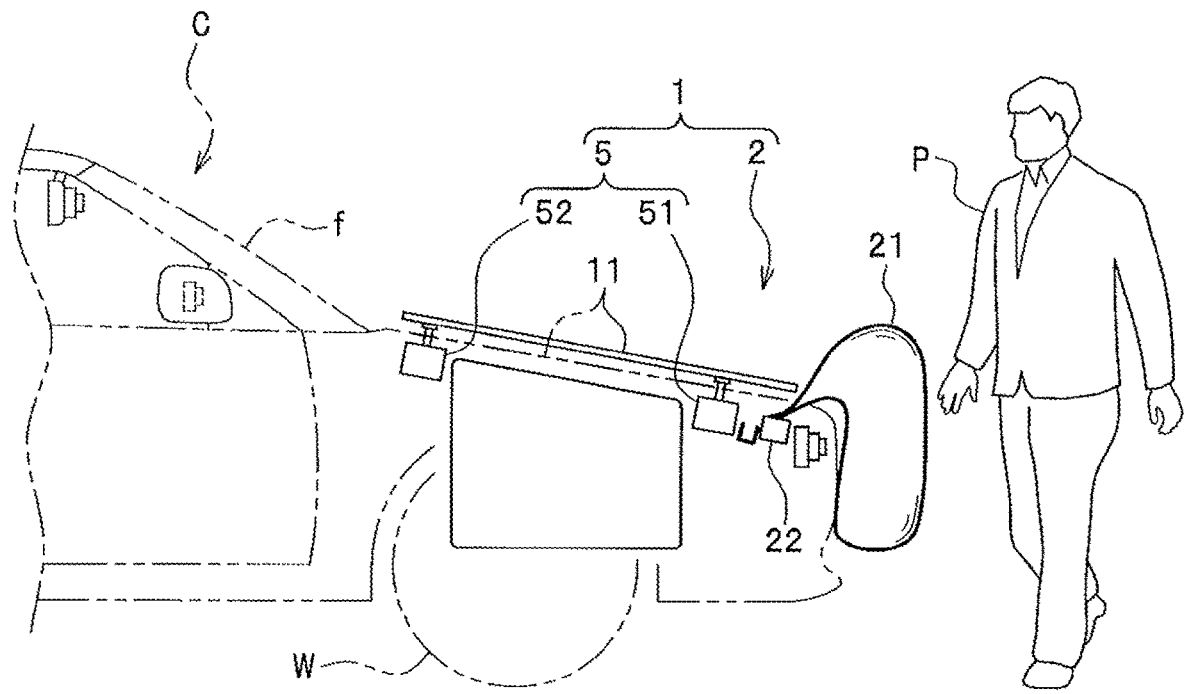
FIG. 2A is a diagram illustrating how an airbag device works.
Figure 2B:
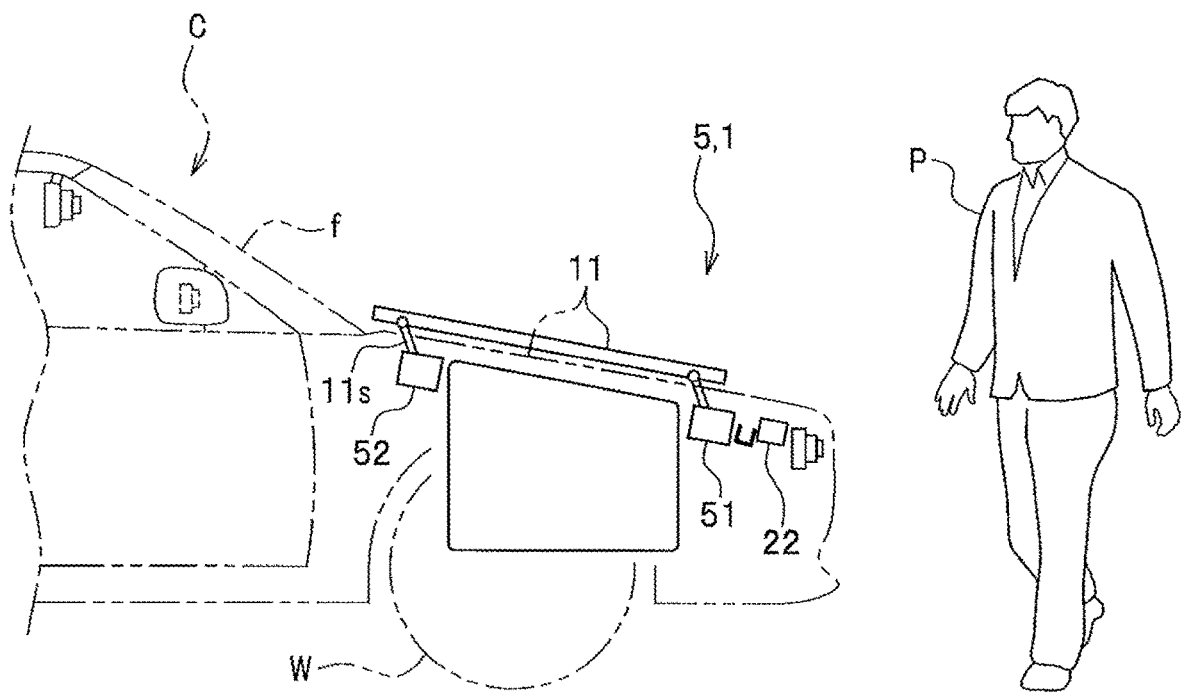
FIG. 2B is a diagram illustrating how a pop-up device works.

FIG. 2A is a diagram illustrating how the airbag device 2 works. FIG. 2B is a diagram illustrating how the pop-up device 5 works.

As discussed above, the airbag device 2 and the pop-up device 5 are components of the vehicular protection device 1, and protect a protection target P, such as a pedestrian, depending on a situation in the event of a collision of the protection target P with the vehicle C. Specifically, the airbag device 2 deploys (inflates) the airbag 21, and thereby protects the protection target P, for example as illustrated. In addition, the pop-up device 5 pushes the hood 11 upward, and thereby protects the protection target P as bounced onto the hood 11, for example as illustrated.

Figure 3:
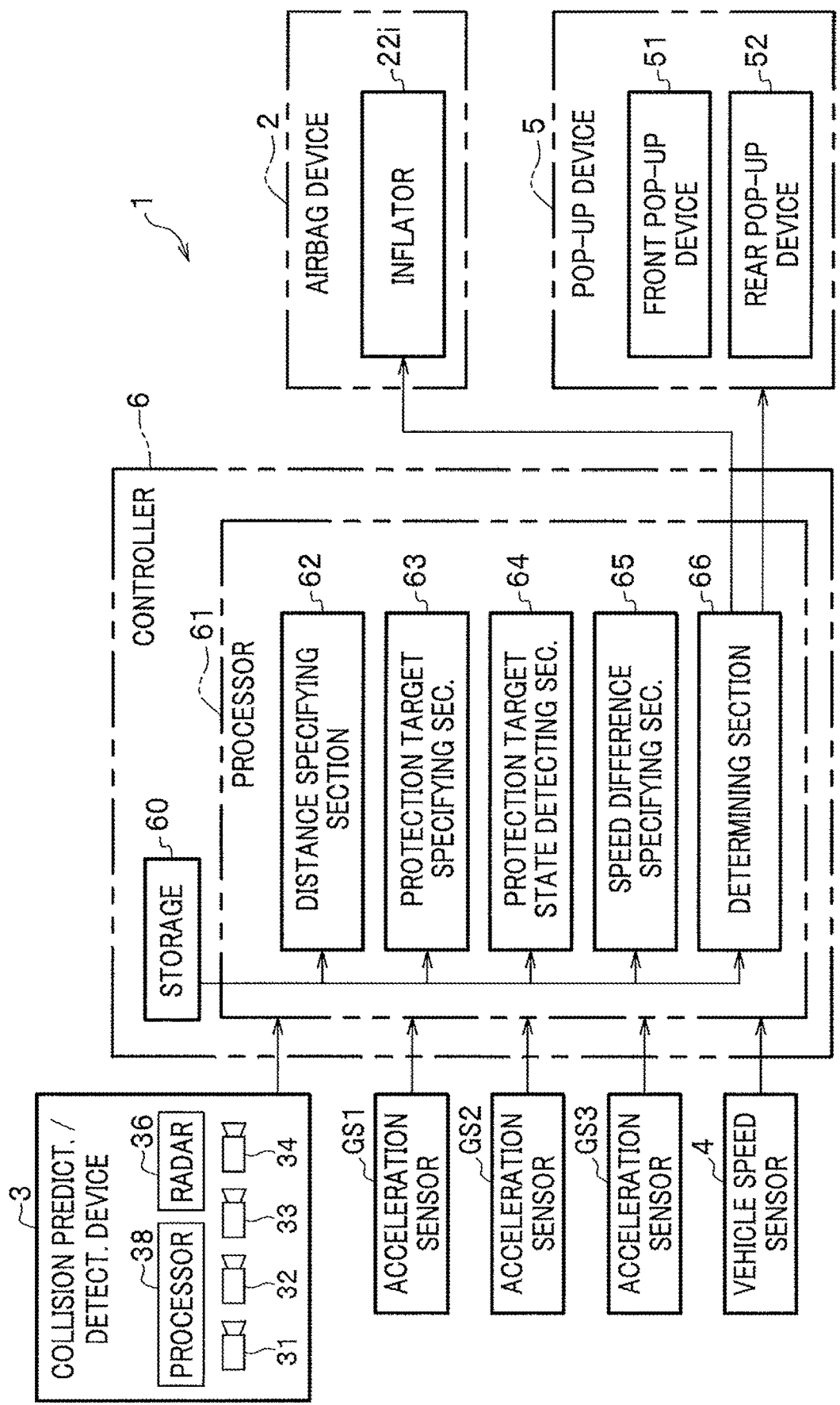
FIG. 3 is a control block diagram of the vehicular protection device.

FIG. 3 is a control block diagram of the vehicular protection device 1.

The vehicular protection device 1 includes the airbag device 2, a collision predicting/detecting device 3, a vehicle speed sensor 4, the acceleration sensors GS1, GS2, GS3, the pop-up device 5, and the controller 6.

<Collision Predicting/Detecting Device 3>

The collision predicting/detecting device 3 illustrated in FIG. 3 includes cameras 31 to 34, a radar device 36, and a processor 38. The radar device 36 is, for example, a millimeter wave radar or a laser radar. The processor 38 is formed from, for example, a CPU, a ROM and a RAM, and controls the cameras 31 to 34 and the radar device 36. In this respect, none of the cameras 31 to 34 and the radar device 36 have to be specialized for the collision predicting/detecting device 3. For example, cameras and a radar device to be used for the advanced driver assistance system (ADAS) may be used as the cameras 31 to 34 and the radar device 36 for the collision predicting/detecting device 3 at the same time. The radar device 36 detects a protection target P and the distance from the vehicle C to the protection target P, and outputs the detection result as distance information.

The cameras 31 to 34 capture images of an area in front of the vehicle C, and obtain image information on the area in front of the vehicle C. The image information obtained before and after a collision of the vehicle C with a protection target P includes images of the protection target P. The cameras 31 to 34 are, for example, infrared cameras, far-infrared cameras, complementary metal-oxide-semiconductor (CMOS) cameras, or charge-coupled device (CCD) cameras. Particularly, the employment of infrared cameras or far-infrared cameras as the cameras 31 to 34 makes it possible to capture images of the area in front of the vehicle C even at night or the like when it is dark. The distance information outputted from the radar device 36 and the image information outputted from the cameras 31 to 34 are supplied to the controller 6.

As illustrated in FIG. 1, the radar device 36 is installed, for example, behind the hood grille 16. Meanwhile, the camera 31 is mounted on the front of the rear-view mirror 13. Thereby, the camera 31 obtains image information on an area including the area in front of the vehicle C, an area above the hood 11, an area in front of a front windshield f, and the like. In addition, the camera 32 is mounted behind the hood grille 16, and obtains image information on the area in front of the vehicle C. Furthermore, the cameras 33, 34 are set inside the front surfaces of the respective left and right door mirrors 14, 15 with their lenses exposed to the outside through the front surfaces thereof so as to obtain image information on areas in front of the left and right of the vehicle C.

In the example illustrated in FIG. 1, the four cameras 31 to 34 are provided to the rear-view mirror 13, the hood grille 16 and the door mirrors 14, 15, respectively. These cameras, however, may be provided in different locations. In addition, the configuration may be, for example, such that only the camera 31 is provided to the rear-view mirror 13.

<Vehicle Speed Sensor 4 and Acceleration Sensors GS1 to GS3>

The vehicle speed sensor 4 illustrated in FIG. 3 detects the speed of the vehicle C, and outputs the detected speed as vehicle speed information. The vehicle speed sensor 4 detects the vehicle speed, for example, by detecting rotations of a wheel W (see FIG. 1). In addition, as illustrated in FIG. 1, the acceleration sensors GS1 to GS3 are embedded in the front bumper 18. The acceleration sensors GS1 to GS3 detect the accelerations applied to the sensors, and outputs the detected results as acceleration information. The acceleration information is outputted for the controller 6, although discussed later, to determine whether the vehicle C has collided with a protection target P. The acceleration information detected by the acceleration sensors GS1 to GS3 and the vehicle speed information detected by the vehicle speed sensor 4 are supplied to the controller 6.

As illustrated in FIG. 1, the acceleration sensors GS1 to GS3 are set in the left, right and center of the inside of the front bumper 18. This setting makes it possible for the acceleration sensors GS1 to GS3 in the three respective locations in the front bumper 18 to detect a possible collision with any part of the front bumper 18 with a protection target P.

<Controller 6>

In FIG. 3, the controller 6 includes storage 60 and a processor 61.

The storage 60 stores information on templates for various contour shapes and other external appearance features that define a "pedestrian" and an "aggregation of a cyclist and a vehicle on which to ride." The templates representing a pedestrian will be hereinafter referred to as "pedestrian templates." The templates representing an aggregation will be hereinafter referred to as "aggregation templates." These templates are used to analyze whether the image information from the cameras 31 to 34 includes a protection target.

The processors 61 includes general computer hardware, such as a central processing unit (CPU), a digital signal processor (DSP), a random access memory (RAM) and a read-only memory (ROM). The ROM stores control programs to be executed by the CPU, microprograms to be executed by the DSP, various data, and the like. In FIG. 3, the inside of the processor 61 includes blocks representing functions to be implemented by the control programs, the microprograms and the like.

Specifically, the processor 61 includes a distance specifying section 62, a protection target specifying section 63, a protection target state detecting section 64, a speed difference specifying section 65 and a determining section 66.

The processor 61 is supplied with the image information from the cameras 31 to 34 in the collision predicting/detecting device 3, the distance information from the radar device 36 in the collision predicting/detecting device 3, the acceleration information from the acceleration sensors GS1 to GS3, and the vehicle speed information from the vehicle speed sensor 4. Based on the information thus supplied, the processor 61 carries out various processes, which will be discussed later.

The distance specifying section 62 identifies a distance between the vehicle C and the protection target P, that is to say, a vehicle-to-protection target distance. For example, the distance information supplied from the radar device 36 may be used in the presently-existing condition without modification to serve as the vehicle-to-protection target distance. Otherwise, the vehicle-to-protection target distance may be calculated by analyzing parallax images based on the image information on the images that are captured by some of the cameras 31 to 34 at the same time.

The protection target specifying section 63 specifies a protection target P based on the image information supplied from cameras 31 to 34. As discussed above, the protection target P is either a "pedestrian" or an "aggregation of a cyclist and a vehicle on which to ride." As discussed above, the storage 60 stores the "pedestrian templates" and the "aggregation templates." The protection target specifying section 63 has a function of specifying a pedestrian or an aggregation from objects included in the image information.

In this respect, each "object" is a set of pixels included in the image information, and having a contour. For example, referring to the pedestrian templates, the protection target specifying section 63 recognizes an object having a contour shape similar to that of one in the pedestrian templates as a pedestrian. Furthermore, referring to the aggregation templates, the protection target specifying section 63 recognizes an object having a contour shape similar to that of one in the aggregation templates as an aggregation.

The protection target state detecting section 64 specifies conditions of a protection target P, such as the movement direction and movement speed of the protection target P. The protection target state detecting section 64 specifies the movement direction and movement speed of the protection target P, for example, from differences between data on images captured in time series. The protection target state detecting section 64 may specify not only the movement direction and movement speed of the protection target P before the collision, but also the movement direction and movement speed of the protection target P that is bounced onto the hood 11 after the collision.

The speed difference specifying section 65 specifies a speed difference between the vehicle C and the protection target P (speeds of the vehicle C and the protection target P relative to each other) after the collision with the protection target P. In general, in the event of a collision between the vehicle C and the protection target P, the speed of the vehicle C decreases since the vehicle C decelerates, while the speed of the protection target P increases since the protection target P is pushed by the vehicle C.

When the speed difference between the vehicle C and the protection target P, specified by the speed difference specifying section 65, becomes equal to or less than a threshold, the determining section 66 determines that a collision is predicted, and deploys the airbag 21. The determining section 66 determines whether the vehicle C and the protection target P will collide with each other, based on the information from the distance specifying section 62 and the information from the protection target state detecting section 64. The determining section 66 predicts that the vehicle C and the protection target P will collide with each other, for example, in a case where the determining section 66 determines that even application of an automatic brake function for the deceleration cannot make the vehicle C avoid the collision with the protection target P. Furthermore, the determining section 66 determines that the vehicle C has collided with the protection target P, in a case where the distance between the vehicle C and the protection target P becomes equal to zero.

In addition, the determining section 66 can determine whether the vehicle C has collided with the protection target P, based on the accelerations detected by the acceleration sensors GS1 to GS3.

In the case where the determining section 66 predicts a possible collision or detects an actual collision, the determining section 66 activates an inflator 22$i$ of the airbag device 2, the front pop-up device 51 and the rear pop-up device 52 by sending an activation signal to the systems.

<Airbag Device 2>

In FIG. 1, the airbag device 2 includes an airbag module 22. The airbag device 2 stores the airbag 21 (see FIG. 2A) as folded. Upon receipt of the activation signal from the determining section 66 (see FIG. 3) of the controller 6, the airbag device 2 deploys the airbag 21 toward the front of the vehicle C so as to protect the protection target P, as illustrated in FIG. 2A.

Figure 4A:
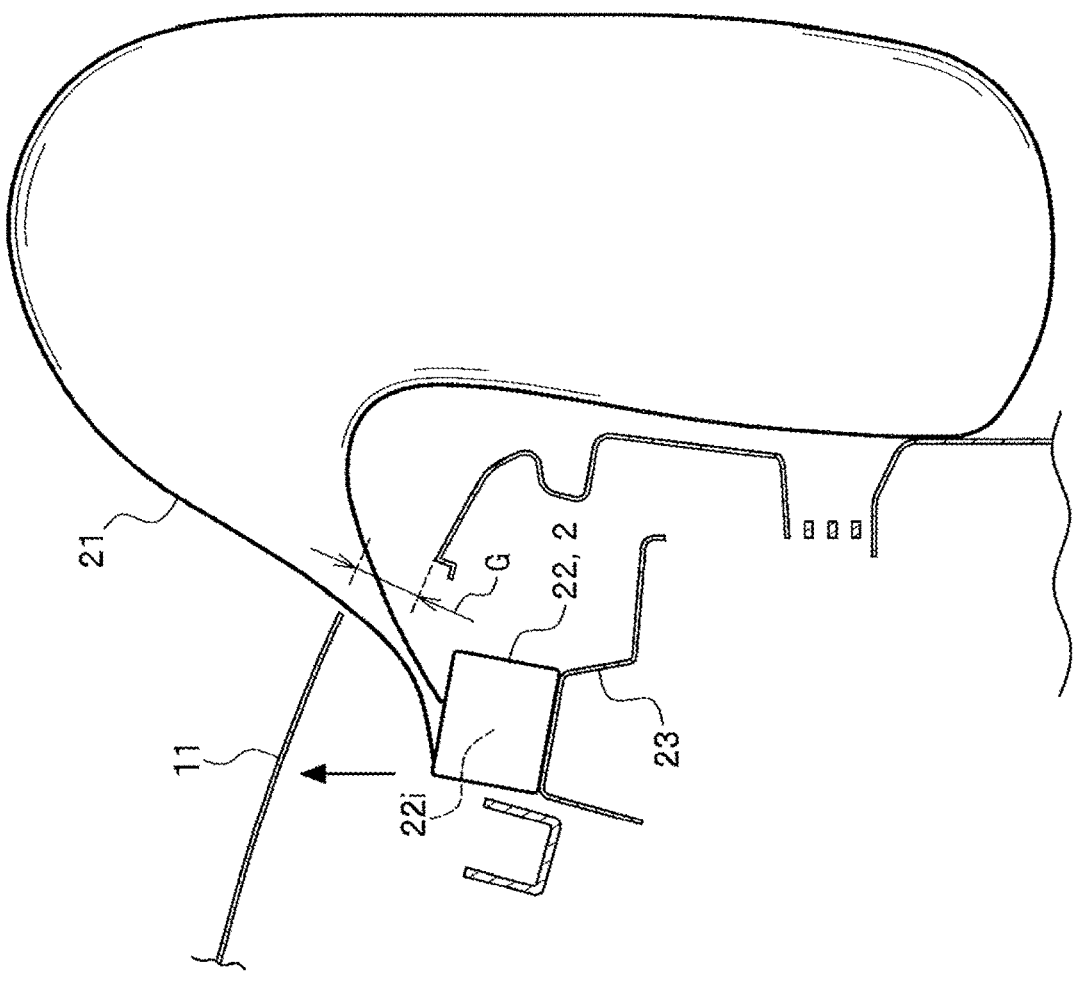
FIG. 4A is a side cross-sectional diagram of a vehicle around the airbag device as inactivated.
Figure 4B:
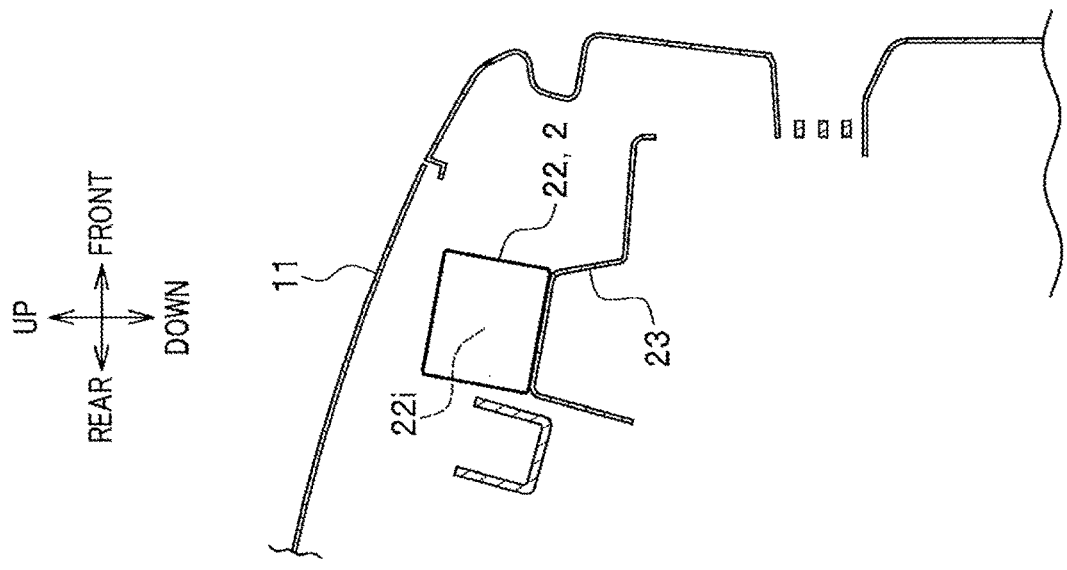
FIG. 4B is a side cross-sectional diagram of the vehicle around the airbag device when the airbag device is activated.

FIG. 4A is a side cross-sectional diagram of the vehicle C around the airbag device 2 as inactivated, and FIG. 4B is a side cross-sectional diagram of the vehicle C around the airbag device 2 when the airbag device 2 is activated in a modification.

The airbag module 22 is set on a strength member 23 around the radiator inside the vehicle C. The inflator 22$i$ is set inside the airbag module 22. As illustrated in FIG. 1, the airbag module 22 is formed long in the vehicle width direction with its shape corresponding to the shape of the airbag 21, for the purpose of letting the airbag 21 smoothly spread extensively in the vehicle width direction.

The airbag 21 includes a vent hole (whose illustration is omitted) formed therein to let air pass out of the airbag 21 for the purpose of appropriately deflating the airbag 21 after the deployment. The inflator 22$i$ includes, for example, an ignitor (not illustrated) electrically connected to the controller 6 (see FIG. 3), a gas generating agent such as sodium azide, and a case body for containing the ignitor and the gas generating agent. In the case where the protection target P is a pedestrian, the determining section 66 (see FIG. 3) activates the airbag device 2. In other words, the determining section 66 outputs the activation signal to the inflator 22$i$. On the other hand, in the case where the protection target P is an "aggregation of a cyclist and a vehicle on which to ride," the determining section 66 inactivates the airbag device 2. In other words, the determining section 66 outputs no activation signal to the inflator 22$i$. The reason for this will be discussed later.

In the case where the protection target P is a pedestrian, if the determining section 66 (see FIG. 3) predicts a possible collision or detects an actual collision, the determining section 66 supplies the activation signal to the inflator 22$i$.

When the activation signal is sent from the determining section 66, the ignitor of the inflator 22$i$ allows the gas generating agent to combust instantaneously. This causes the inflator 22$i$ to generate a high-pressure gas and inflate the airbag 21 with the gas instantaneously, as illustrated in FIG. 2A. During the inflation, as discussed above, the airbag 21 pushes upward and turns the hood edge cover 17 (see FIG. 1), and inflates in front of the vehicle C. Alternatively, as the modification, the pop-up device 5 may be configured to slightly open the hood 11 to create a gap G through which to inflate the airbag 21 toward the front of the vehicle C, as illustrated in FIG. 4B.

Note that in place of the pop-up device 5, an electromagnetic type hood opener may be configured to unlock and open the hood 11 to create the gap G. As illustrated in FIG. 4B, the activation of the airbag device 2 deploys the airbag 21 in front of the vehicle C, places the inflated airbag 21 between the vehicle C and the protection target P, and thereby mitigates the impact on the protection target P.

<Pop-Up Device 5>

When the determining section 66 predicts/determines that the protection target P will collide with the vehicle C, the pop-up device 5 illustrated in FIG. 3 pushes the hood 11 upward to increase the movement stroke of the hood 11, as illustrated in FIG. 2B. Thereby, the pop-up device 5 increases the deformation space of the hood 11, and enhances the capability of absorbing the impact on the protection target P.

Figure 5A:
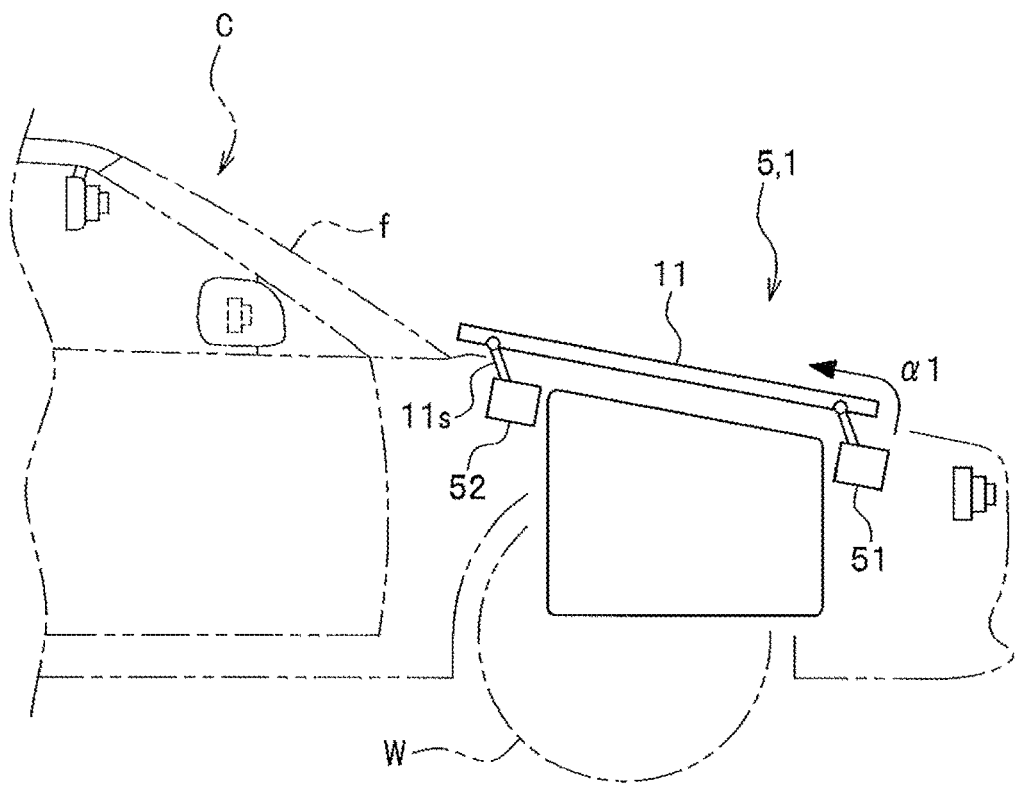
FIG. 5A is a schematic side cross-sectional diagram illustrating how front and rear pop-up devices slide a hood toward the vicinity of a root of a front windshield at the back of the front and rear pop-up devices.
Figure 5B:
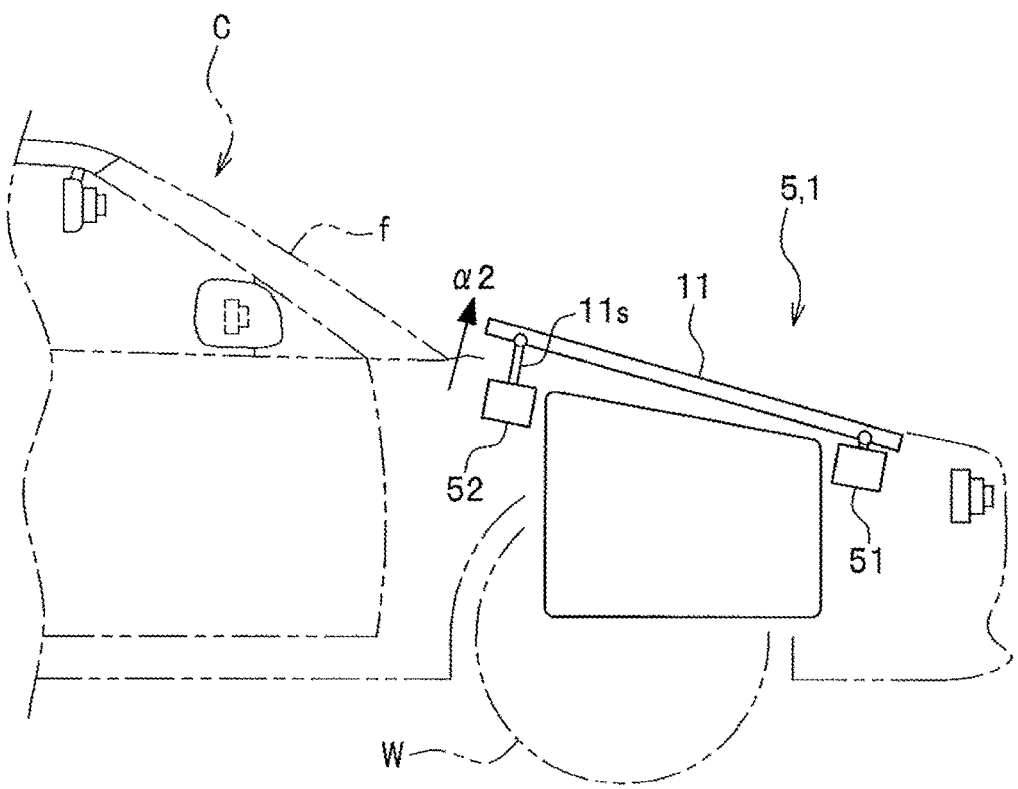
FIG. 5B is a schematic side cross-sectional diagram illustrating how the rear pop-up device pushes a rear side of the hood upward instantaneously.

FIG. 5A is a schematic side cross-sectional diagram illustrating how the front and rear pop-up devices 51, 52 slide the hood 11 toward the vicinity of a root of the front windshield f at the back of the front and rear pop-up devices 51, 52, and FIG. 5B is a schematic side cross-sectional diagram illustrating how the rear pop-up device 52 pushes the rear side of the hood 11 upward instantaneously.

In the case where the determining section 66 of the controller 6 determines that the protection target P will collide with the vehicle C, the activation signal from the determining section 66 activates the pop-up device 5. In this case, the determining section 66 chooses between first and second operation modes. The first operation mode is that which, as illustrated in FIG. 5A, operates the front and rear pop-up devices 51, 52 to slide all the hood 11 toward the vicinity of the root of the front windshield f at the back of the front and rear pop-up devices 51, 52 (see an arrow α1). Meanwhile, the second operation mode is that which, as illustrated in FIG. 5B, pushes the rear side of the hood 11 upward (see an arrow α2).

Drivers of the pop-up device 5 are not limited to specific ones, and are, for example, motors or gas generators such as micro gas generators. In a case where motors are used as the drivers of the pop-up device 5, the use of gears and cams serving as a reduction mechanism can realize the tracks of movement of the hood 11, which are illustrated in FIGS. 5A and 5B. Cams for, as illustrated in FIG. 5A, sliding all the hood 11 toward the vicinity of the root of the front windshield f at the back of the front and rear pop-up devices 51, 52 will be referred to as first cams. Meanwhile, cams for, as illustrated in FIG. 5B, pushing the rear side of the hood 11 upward will be referred to as second cams. In the case where the pop-up device 5 is provided with the first and second cams, the pop-up device 5 can realize an arbitrary one of the operations illustrated in FIGS. 5A and 5B by switching between the first and second cams.

Furthermore, in the case where the motors are used as the drivers of the pop-up device 5, links may be used instead of the first and second cams. Links for, as illustrated in FIG. 5A, sliding all the hood 11 toward the vicinity of the root of the front windshield f at the back of the front and rear pop-up devices 51, 52 will be referred to as first links. Meanwhile, links for, as illustrated in FIG. 5B, pushing the rear side of the hood 11 upward will be referred to as second links. In the case where the pop-up device 5 is provided with the first and second links, the pop-up device 5 can realize an arbitrary one of the operations illustrated in FIGS. 5A and 5B by switching between the first and second links. Incidentally, in the case where the cams or the links are used for the drivers of the pop-up device 5, the cams and the links may be used in combination.

How the Embodiment Works

<Airbag Device Control Routine>

Next, descriptions will be provided for how the embodiment works. A prerequisite for the below-described working is that, as illustrated in FIG. 1, the hood 11 and the hood edge cover 17 are inside the vehicle body. Another prerequisite is that the airbag module 22 contains the airbag 21, as folded.

Once the driver turns on an ignition switch (whose illustration is omitted) inside the vehicle C, the collision predicting/detecting device 3 including the cameras 31 to 34 and the radar device 36, the acceleration sensors GS1 to GS3, the vehicle speed sensor 4 (see FIG. 3) and the like are driven. Thereby, the vehicular protection device 1 becomes capable of monitoring protection targets P, and the vehicular protection device 1 is activated.

Figure 6:
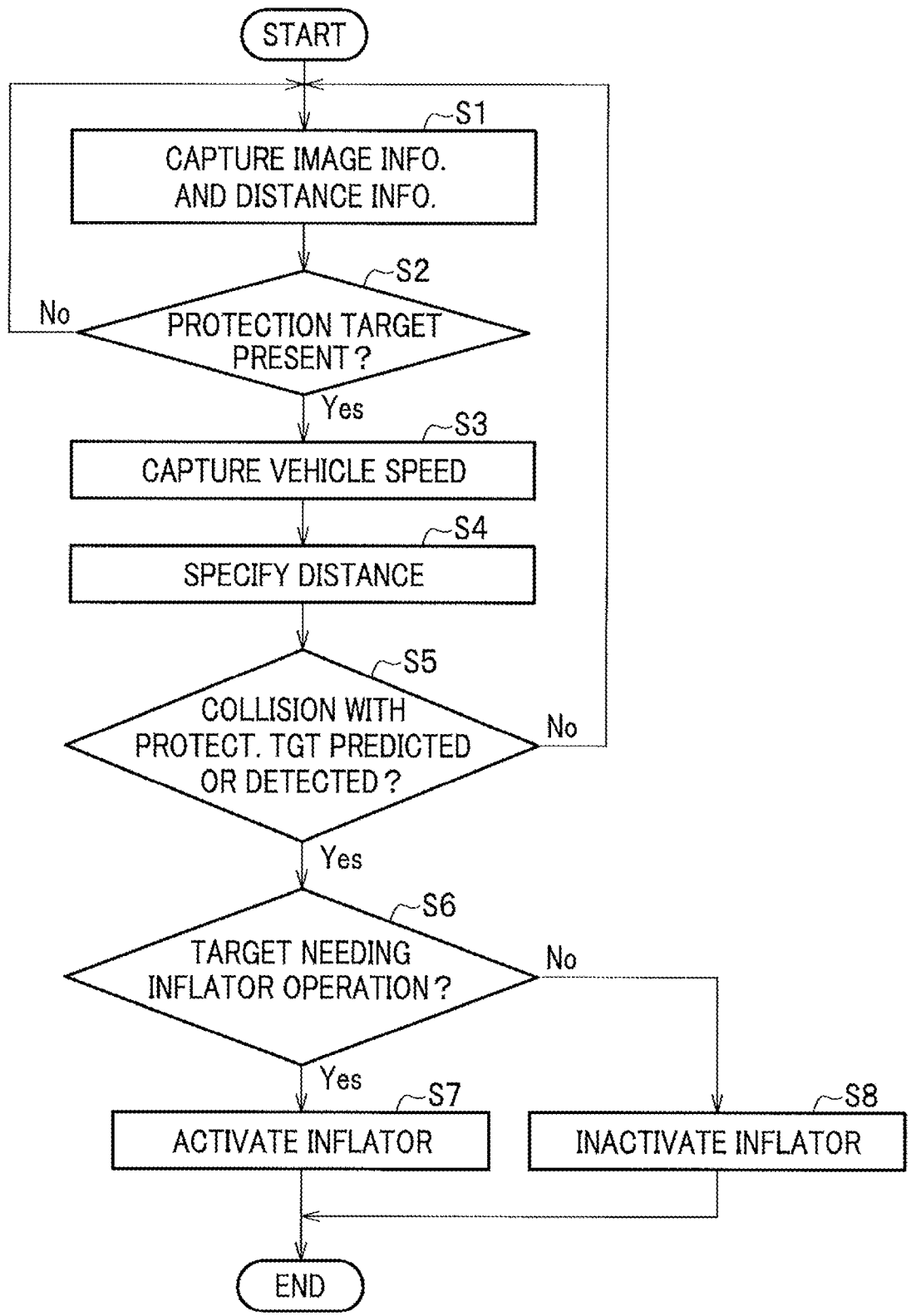
FIG. 6 is a flowchart illustrating how the airbag device works.

FIG. 6 is a flowchart of an airbag device control routine to be performed by the processor 61 (see FIG. 3) after the activation of the vehicular protection device 1.

In FIG. 6, the process proceeds to step S1, where the processor 61 captures the image information on the area in front of the vehicle, and the distance information. Specifically, the processor 61 (see FIG. 3 receives the image information from the cameras 31 to 34 in the collision predicting/detecting device 3, and the distance information from the radar device 36 in the collision predicting/detecting device 3.

Next, the process proceeds to step S2, where the protection target specifying section 63 (see FIG. 3) determines whether a protection target P is present. In this embodiment, as discussed above, the protection target P is a "pedestrian" or an "aggregation of a cyclist and a vehicle on which to ride (for example, a bicycle)." The protection target specifying section 63 extracts one or more objects from the image information, compares each extracted object with the pedestrian templates, and thereby determines whether there is a protection target P as a "pedestrian."

In this respect, if there is no protection target P as a pedestrian, the protection target specifying section 63 compares each extracted object with the aggregation templates, and thereby determines whether there is a protection target P as an "aggregation of a cyclist and a vehicle on which to ride." If there is no protection target P as a pedestrian, or no protection target P as an "aggregation," the protection target specifying section 63 determines "No" in step S2. Thereafter, the process returns to step S1. Subsequently, the process repeats a loop between steps S1 and S2 until a protection target P is found. If a protection target P is present, the protection target specifying section 63 determines "Yes" in step S2, and the process proceeds to step S3.

In step S3, the distance specifying section 62 (see FIG. 3) receives the vehicle speed information from the vehicle speed sensor 4.

Next, the process proceeds to step S4, where the distance specifying section 62 specifies the distance between the vehicle C and the protection target P, that is to say, the vehicle-to-protection target distance. As discussed above, the distance information supplied from the radar device 36 may be used in the presently-existing condition without modification to serve as the vehicle-to-protection target distance. Otherwise, the vehicle-to-protection target distance may be calculated by analyzing the parallax images based on the image information on the images that are captured by some of the cameras 31 to 34 at the same time.

Next, the process proceeds to step S5, where the determining section 66 determines whether it can be predicted that the protection target P will collide with the vehicle C, based on the vehicle speed information received in step S3 and the vehicle-to-protection target distance specified in step S4.

This determination is made, for example, as follows. To begin with, if step S5 is performed for the first time, the determining section 66 determines "No." Thus, the process returns to step S1, and the process from step S1 through step S4 is performed again. Thereafter, the process proceeds to step S5, which means that steps S3 and S4 have been performed twice or more times. The processor 61, therefore, has obtained the vehicle speed information and the vehicle-to-protection target distance at two or more timings. In this case, the speed difference specifying section 65 (see FIG. 3) calculates the speed difference between the vehicle C and the protection target P (the speeds of the vehicle C and the protection target P relative to each other), based on: the vehicle speed information and the vehicle-to-protection target distance obtained at the last timing; the vehicle speed information and the vehicle-to-protection target distance obtained at the penultimate timing; and a time length that has elapsed from the penultimate timing through the last timing.

If one of the following conditions C1, C2 is satisfied, the determining section 66 determines "Yes" in step S5. If neither of the two conditions is satisfied, the determining section 66 determines "No" in step S5.

Condition C1: a prediction that the protection target P will collide with the vehicle C. The prediction that the protection target P will collide with the vehicle C is made based on the speed difference (the relative speeds) calculated by the speed difference specifying section 65.

Condition C2: a detection that the protection target P has collided with the vehicle C. This detection is made when the acceleration information outputted from any one of the acceleration sensors GS1 to GS3 exceeds a predetermined level (a level that allows the determining section 66 to determine that the collision has happened).

If the determining section 66 determines "No" in step S5, the process returns to step S1, and the process from step S1 through step S4 is repeated. On the other hand, if the determining section 66 determines "Yes" in step S5, the process proceeds to step S6, where the determining section 66 determines whether the protection target P is a target that needs the activation of the inflator 22i. Specifically, if the protection target P is a "pedestrian," the determining section 66 determines "Yes" (that is to say, the protection target P is a target that needs the activation of the inflator 22i). If the protection target P is an "aggregation of a cyclist and a vehicle on which to ride," the determining section 66 determines "No" (that is to say, the protection target P is not a target that needs the activation of the inflator 22i).

Figure 7A:
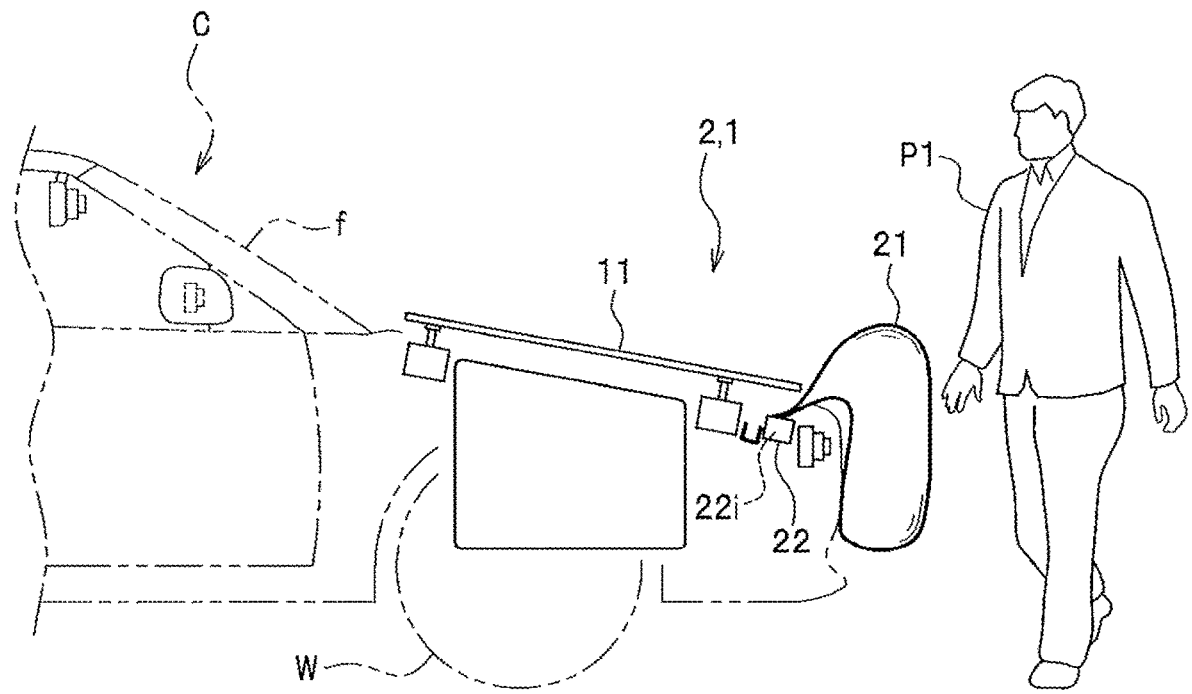
FIG. 7A is a diagram illustrating how the airbag device works for a pedestrian.

If the determining section 66 determines "Yes" in step S6, the process proceeds to step S7, where under the control of the determining section 66, the controller 6 outputs the activation signal to the inflator 22i and thereby activates the inflator 22i. FIG. 7A illustrates how the airbag device 2 works for a protection target P1 as a "pedestrian." As illustrated, the inflator 22i is activated to inflate the airbag 21, and the inflated airbag 21 absorbs impact on the protection target P1 as the "pedestrian" and thereby protects the protection target P1 when the protection target P1 collides with the vehicle C.

Figure 7B:
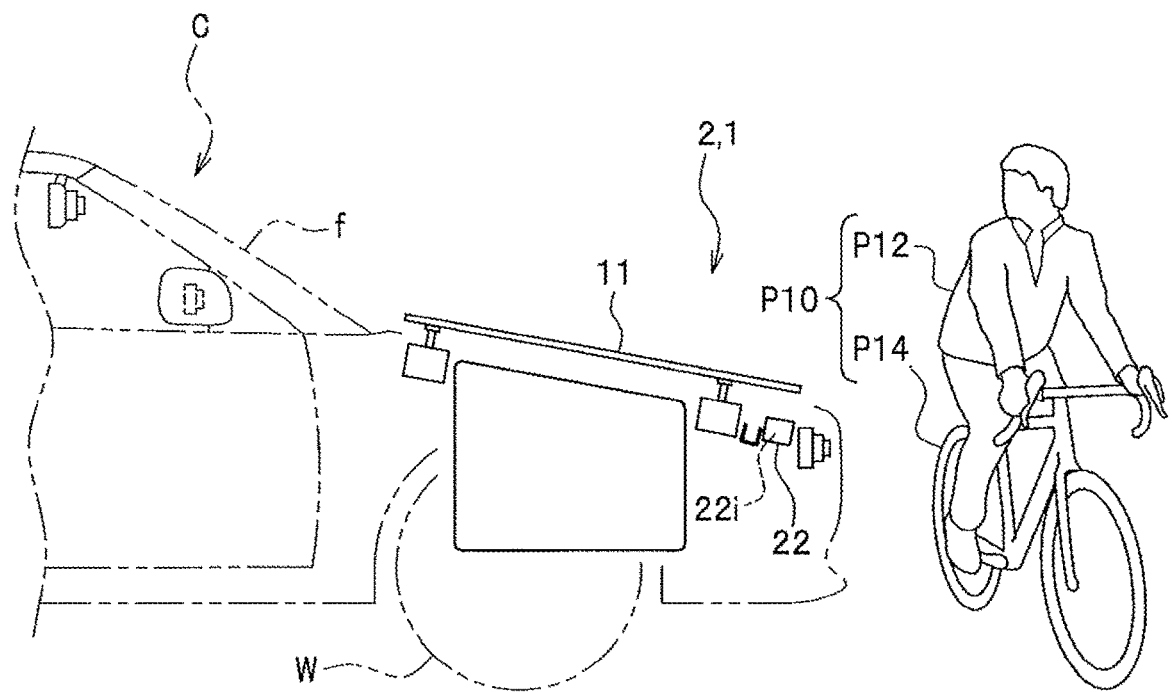
FIG. 7B is a diagram illustrating how the airbag device works for a cyclist riding a bicycle.

On the other hand, if the determining section 66 determines "No" in step S6, the process proceeds to step S8, where the inflator 22i is inactivated. FIG. 7B illustrates how the airbag device 2 works for a protection target P10 as an "aggregation of a cyclist and a vehicle on which to ride." More specifically, the protection target P10 in FIG. 7B is an aggregation of a cyclist P12 and a vehicle P14 on which to ride. Furthermore, in the illustrated example, the vehicle P14 on which to ride is a bicycle.

If the inflator 22i would be activated under an illustrated situation, the airbag 21 (see FIG. 7A) would send the vehicle P14 on which to ride flying when the airbag 21 inflates. Once the airbag 21 would send the vehicle P14 on which to ride flying, it would become difficult to predict the subsequent behavior of the cyclist P12, and it would become impossible to protect the cyclist P12 appropriately. With this taken into consideration, the embodiment is configured such that the airbag 21 is not inflated (the inflator 22i is inactivated) if the protection target P10 is an "aggregation of a cyclist and a vehicle on which to ride."

The vehicular protection device 1 according to the embodiment is capable of detecting which type the protection target P is of in cooperation with the ADAS. Thus, the vehicular protection device 1 is capable of determining whether to deploy the airbag 21 depending on which type the protection target P is of. Accordingly, the vehicular protection device 1 is capable of: appropriately protecting the protection target P using the airbag device 2; and reducing the likelihood that the airbag 21 may hurt the protection target P.

<Pop-Up Device Control Routine>

Figure 8:
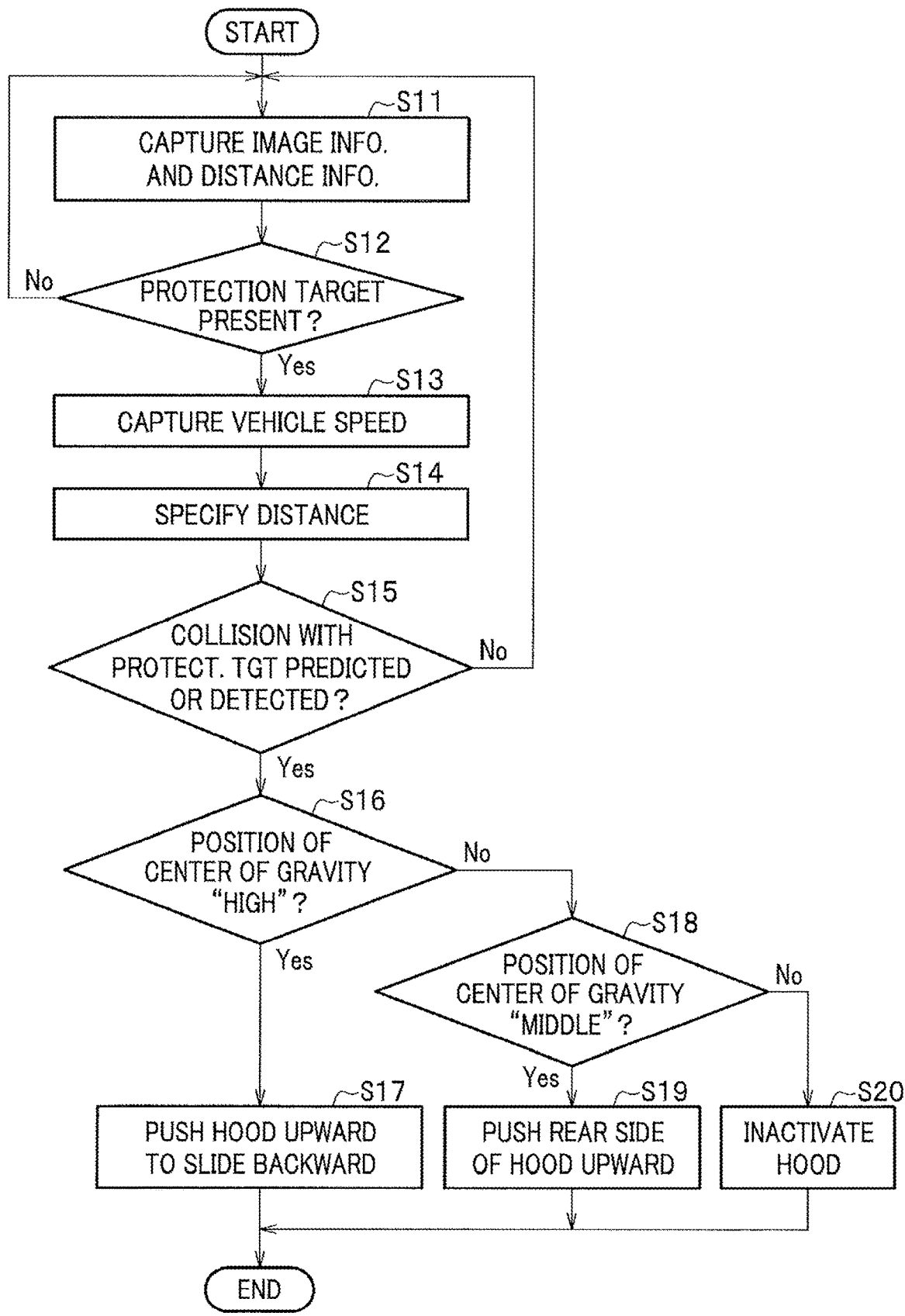
FIG. 8 is a flowchart illustrating how the pop-up device works.

FIG. 8 is a flowchart of a pop-up device control routine to be performed by the processor 61 (see FIG. 3) after the vehicular protection device 1 is activated.

Steps S11 to S15 in FIG. 8 are the same as steps S1 to S5 in FIG. 6, and descriptions for them will be omitted.

If the determining section 66 (see FIG. 3) determines "Yes" in step S15, that is to say, if the determining section 66 determines that the protection target P will collide with the vehicle C, the process proceeds to step S16.

In step S16, the determining section 66 calculates the position of the center of gravity of the protection target P (the height of the center of gravity of the protection target P from the road surface), and classifies the position of the center of gravity into one of "high" (a first range), "middle" (a second range) and "low" (a third range). Furthermore, based on the classification result, the determining section 66 determines whether the position of the center of gravity of the protection target P is high. For example, four values in total are determined in advance: two values represent predetermined heights Ha1, Ha2 (Ha1>Ha2) set for a "pedestrian"; and the other two values represent predetermined heights Hb1, Hb2 (Hb1>Hb2) for an "aggregation of a cyclist and a vehicle on which to ride." Thus, in the case where the protection target P is a "pedestrian," the determining section 66 may classify the position of the center of gravity into "high" if the position of the center of gravity is equal to or higher than Ha1, into "middle" if the position of the center of gravity is less than Ha1 but not less than Ha2, and into "low" if the position of the center of gravity is less than Ha2.

Similarly, in the case where the protection target P is an aggregation, the determining section 66 may classify the position of the center of gravity into "high" if the position of the center of gravity is equal to or higher than Hb1, into "middle" if the position of the center of gravity is less than Hb1 but not less than Hb2, and into "low" if the position of the center of gravity is less than Hb2. If the determining section 66 determines "Yes" (that is to say, the position of the center of gravity is "high"), the process proceeds to step S17.

Figure 9:
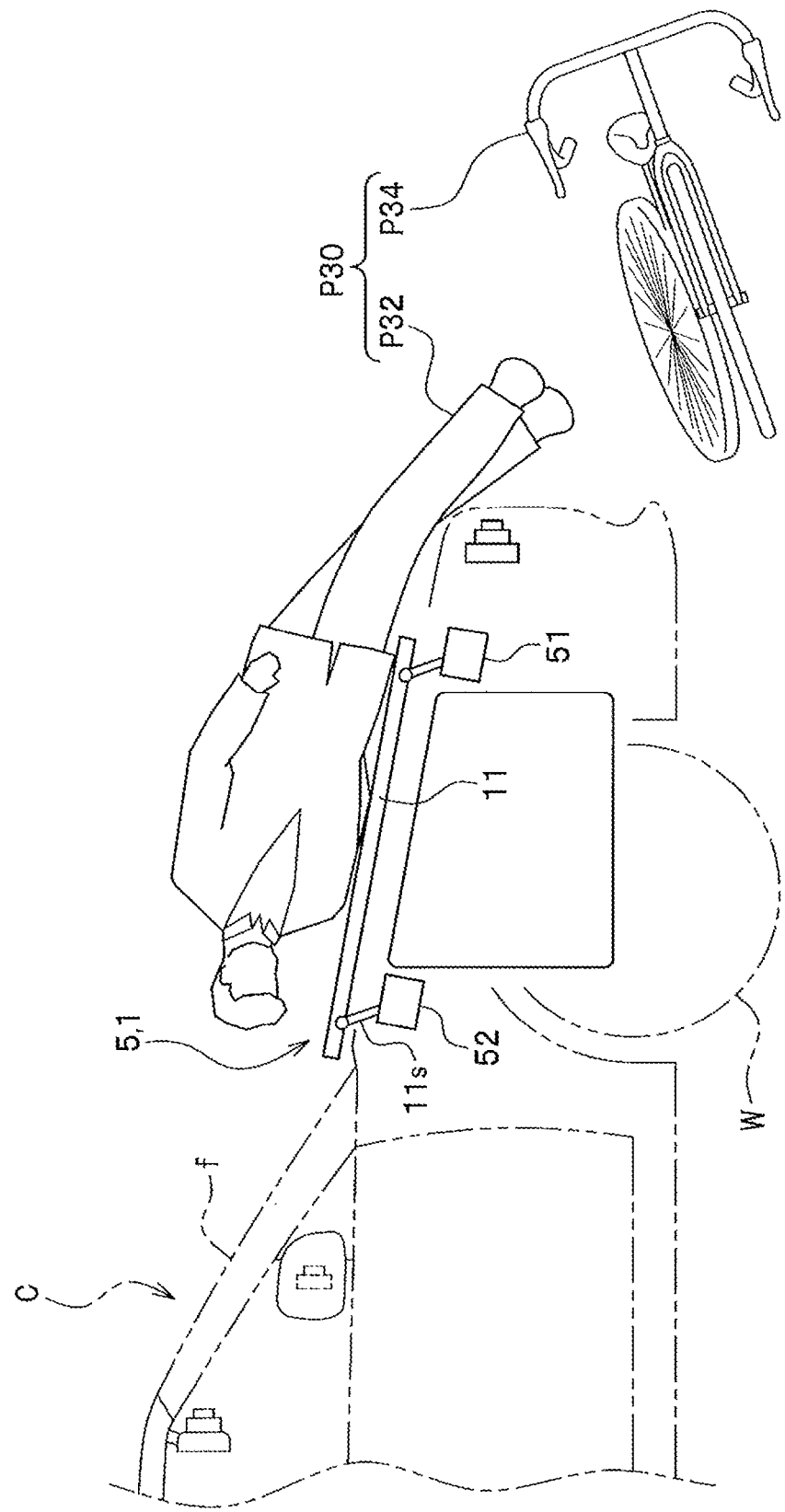
FIG. 9 is a diagram illustrating how the pop-up device works for a protection target whose center of gravity is high in position.

In step S17, the determining section 66 activates all the motors for the front and rear pop-up devices 51, 52. Thereby, as illustrated in FIG. 9, the hood 11 supported by a support member 11s is pushed upward, and is slid toward the vicinity of the root of the front windshield f at the back of the front and rear pop-up devices 51, 52. In the illustrated example, a protection target P30 is an aggregation of a cyclist P32 and a vehicle P34 on which to ride, and the vehicle P34 on which to ride is a track-racing bicycle with the saddle position set relatively high. Since the cyclist P32 rides the vehicle P34 on to ride that is a track-racing bicycle, the position of the center of gravity of the protection target P30 is relatively high. For this reason, even if the collision between the vehicle C and the protection target P30 sends the cyclist P32 flying as illustrated, the cyclist P32 can be protected by letting the cyclist P32 hit the head against the hood 11 as slid toward the vicinity of the root of the front windshield f at the back of the front and rear pop-up devices 51, 52.

Furthermore, if the protection target is a "pedestrian" and the position of the center of gravity of the protection target is "high," the above-discussed step S17 is performed as well. In this case, too, the front and rear pop-up devices 51, 52 slide the hood 11 toward the vicinity of the root of the front windshield f at the back of the front and rear pop-up devices 51, 52, as illustrated in FIG. 9. A pedestrian whose center of gravity is high in position is a relatively-tall adult in many cases. In the case of a relatively-tall pedestrian, the process in step S17 makes it possible to protect the pedestrian by letting the pedestrian hit the head against the hood 11.

In addition, if the determining section 66 determines "No" (that is to say, the position of the center of gravity is not high) in step S16, the process proceeds to step S18, where the determining section 66 determines whether the position of the center of gravity of the protection target P is "middle." If the determining section 66 determines "Yes" in this step, the process proceeds to step S19.

In step S19, the determining section 66 activates the motor for the rear pop-up device 52 while inhibiting the operation of the front pop-up device 51.

Figure 10:
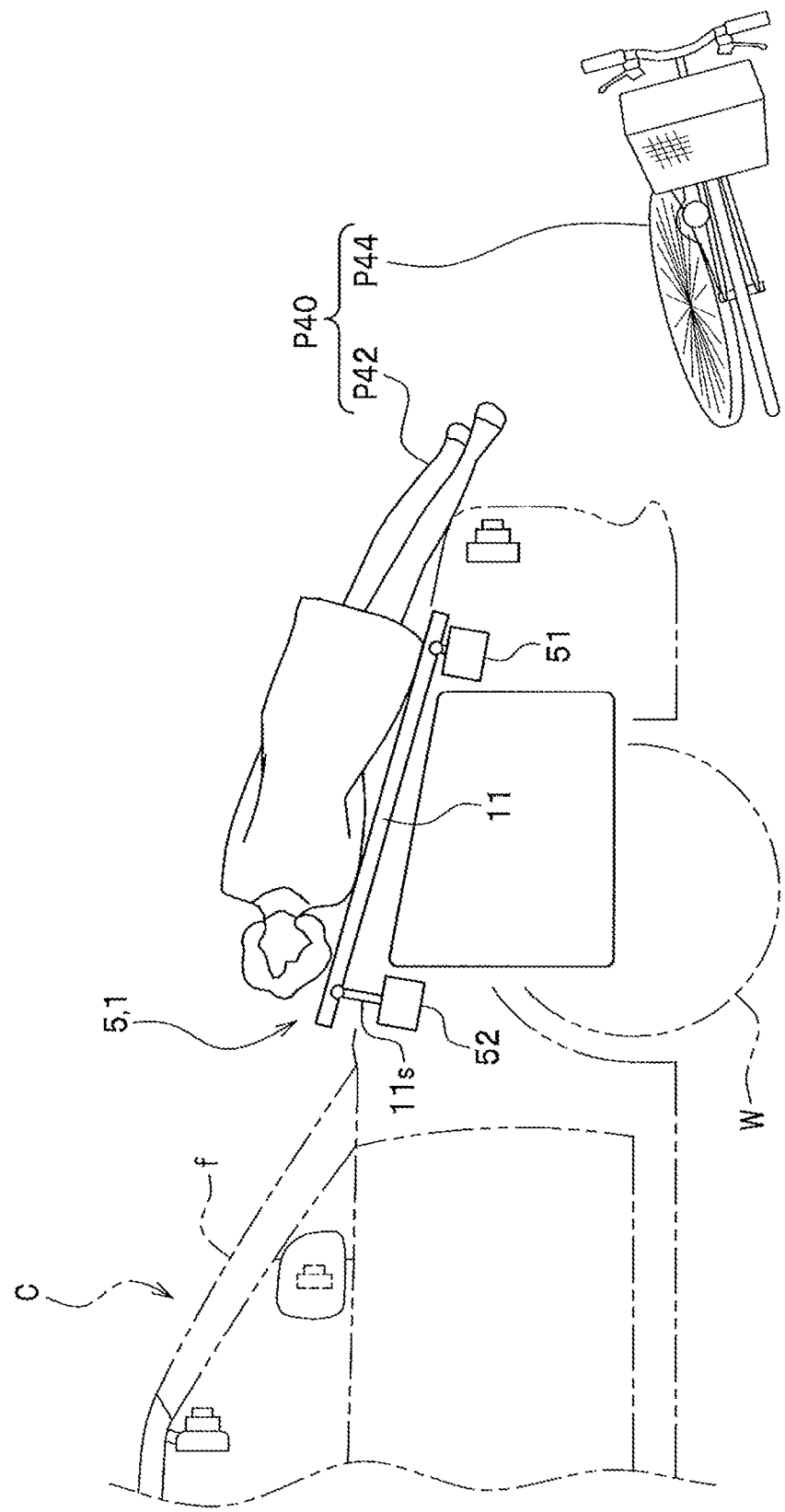
FIG. 10 is a diagram illustrating how the pop-up device works for a protection target whose center of gravity is middle in position.

Specifically, in step S19, the front pop-up device 51 may be inactivated, or may be moved a shorter distance than in step S17. Thereby, as illustrated in FIG. 10, the rear side of the hood 11 supported by the support member 11s is pushed upward. In the illustrated example, a protection target P40 is an aggregation of a cyclist P42 and a vehicle P44 on which to ride, and the vehicle P44 on which to ride is a shopping bicycle with the saddle position set relatively low. For this reason, in the case where the position of the center of gravity of the vehicle P44 on which to ride is "middle," the cyclist P42 can be protected by letting the cyclist P42 hit the head against the rear side of the hood 11.

Moreover, if the protection target is a "pedestrian" and the position of the center of gravity of the protection target is "middle," the above-discussed step S19 is performed as well. In this case, too, the rear pop-up device 52 pushes the rear side of the hood 11 upward, as illustrated in FIG. 10. A pedestrian whose center of gravity is middle in position is a relatively-short adult in many cases. In the case of a relatively-short pedestrian, the process in step S19 makes it possible to protect the pedestrian by letting the pedestrian hit the head against the rear side of the hood 11.

Figure 11:
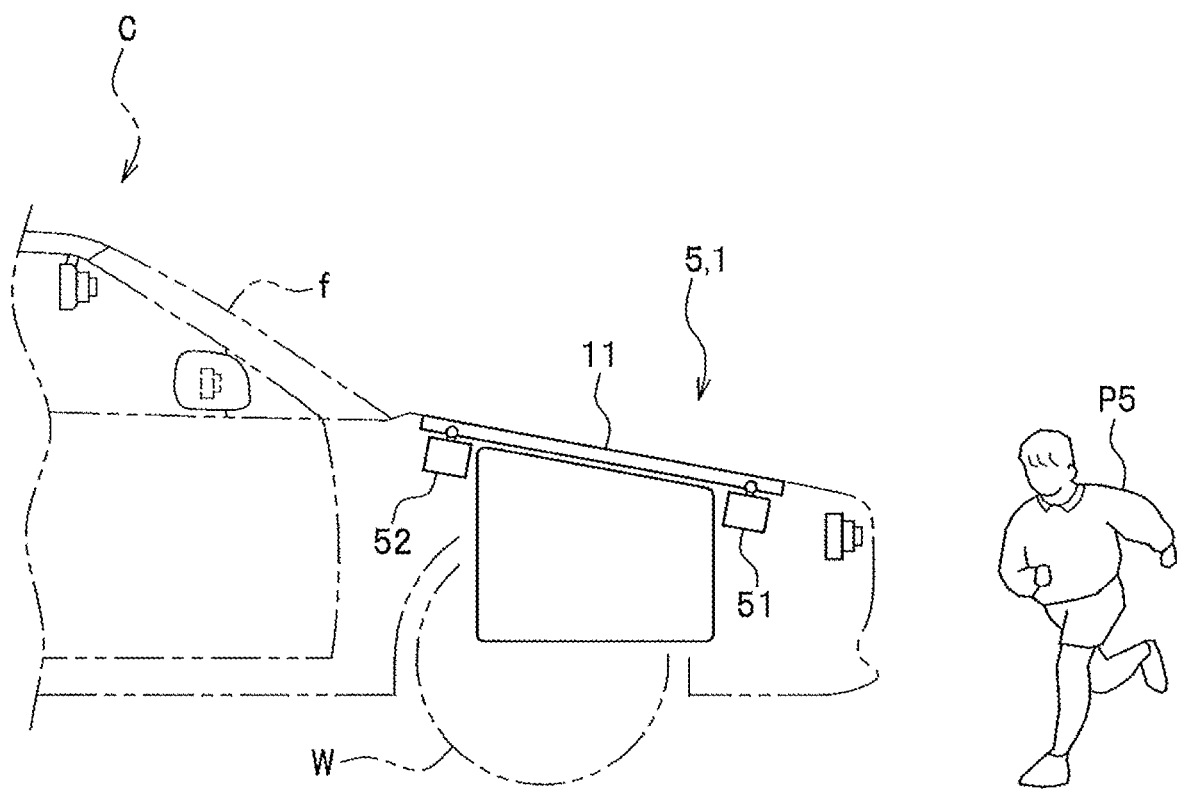
FIG. 11 is a diagram illustrating what condition the pop-up device is in for a protection target whose center of gravity is low in position.

Furthermore, if the determining section 66 determines "No" (that is to say, the position of the center of gravity is low) in step S18, the process proceeds to step S20. In this case, the protection target is a "pedestrian" whose physique is similar to that of a child. What is more, in this case, since the upward pushing of the hood 11 brings about no effect, the front and rear pop-up devices 51, 52 are inactivated. FIG. 11 illustrates what condition the pop-up device 5 is in (that the pop-up device 5 is inactivated) for a protection target P5 as a child.

The configuration of the pop-up device 5 according to the embodiment enables the amount of movement of the hood 11 to be adjusted by the front and rear pop-up devices 51, 52. In addition, since the pop-up device 5 controls the behavior of the hood 11 depending on the position of the center of gravity of the protection target P in cooperation with the ADAS, the protection can be realized depending on the protection target P in the event of the collision of the protection target P with the vehicle C.

Effects of Embodiment

As discussed above, the vehicular protection device (1) according to the embodiment causes the controller (6) to operate the protection device (2, 5) in the mutually-different modes based on whether the protection target (P) includes the predetermined vehicle on which to ride. Thereby, the protection device (2, 5) is capable of realizing the protection depending on the protection target (P) in the event of the collision of the protection target (P) with the vehicle (C).

In addition, the protection device (2, 5) includes: the airbag device (2) that deploys the airbag (21) toward the front of the vehicle; and the pop-up device (5) that moves the hood (11) provided in the front upper section of the vehicle. The controller (6) activates the pop-up device (5) without activating the airbag device (2) if the protection target (P) includes the vehicle (P14, P34, P44) on which to ride, and activates the airbag device (2) and the pop-up device (5) if the protection target (P) does not include the vehicle (P14, P34, P44) on which to ride. Thereby, in the case where the protection target (P) includes the vehicle (P14, P34, P44) on which to ride, it is possible to prevents the airbag device (2) from sending the vehicle on which to ride flying, and to appropriately protect the cyclist riding the vehicle on which to ride.

Furthermore, the controller (6) determines the position of the center of gravity of the protection target (P) based on the information from the measuring device (3); causes the pop-up device (5) to push the hood (11) upward and move the hood (11) backward if the position of the center of gravity belongs to the first range (high); causes the pop-up device (5) to push the rear part of the hood (11) upward if the position of the center of gravity belongs to the second range (middle) lower than the first range; and does inactivate the pop-up device (5) if the position of the center of gravity belongs to the third range (low) lower than the second range (middle).

Moreover, the pop-up device (5) includes the motor as its drive source. The controller (6) predicts the collision between the protection target (P) and the vehicle based on the information from the measuring device (3). Thereby, the pop-up device (5) can be driven before the protection target (P) actually collides with the vehicle (C).

Besides, the pop-up device (5) includes: the front pop-up device (51) including the gas generator that uses explosive as its drive source; and the rear pop-up device (52) including the motor as its drive source, and provided at the back of the front pop-up device (51). It is predicted that the protection target (P) will come into collision with the front section of the hood (11) earlier than with the other section, and the front section of the hood (11) can be driven much earlier.

The vehicular protection device (1) further includes the acceleration sensors (GS1 to GS3) that are provided in the front end section (18) of the vehicle (C), and that detect the collision between the vehicle (C) and the protection target (P). The protection device (2, 5) includes the pop-up device (5) that is activated by the gas generator using the explosive to move the hood (11) provided in the front upper section of the vehicle (C). The controller (6) activates the pop-up device (5) based on the result of the detection by the acceleration sensors (GS1 to GS3). Thereby, the protection device (2, 5) can be activated in response to the result of the detection by the acceleration sensors (GS1 to GS3).

(Modifications)

The present invention is not limited to the above-discussed embodiment, and may be modified variously. The embodiment has been shown as an example of the present invention for the purpose of making the present invention easy to understand. The present invention is not necessarily limited to what includes all the above-discussed components. The present invention may be carried out as a modification of the above-discussed embodiment that includes the components of the embodiment and different components, or as another modification of the above-discussed embodiment that includes different components replacing some of the components of the embodiment and the remaining original components of the embodiment. Furthermore, the drawings show control lines and information lines that are needed for the explanation, but do not necessarily show all the control lines and information lines that are needed for the product. It may be considered that almost all the components are actually connected to one another. Examples of possible modifications to the above-discussed embodiment are as follows.

(1) Since the hardware for the processor 61 in the embodiment can be realized by a general computer, the programs and the like shown in FIGS. 6 and 8 may be stored on a recording medium, or may be distributed through a transmission line.

(2) Although the processes shown in FIGS. 6 and 8 and so on have been explained as the software execution using the programs in the embodiment, part or all of the processes may be replaced with hardware execution using an application specific integrated circuit (ASIC), a field-programmable gate array (FPGA), or the like.

(3) Although the embodiment causes the front and rear pop-up devices 51, 52 to be each driven by the motor, the systems may be each configured to be driven by a gas generator using explosive, and to push the hood 11 upward depending on the position of the center of gravity of the protection target P.

(4) The drivers of the respective front and rear pop-up devices 51, 52 may be different from each other. For example, since the front pop-up device 51 hits the protection target earlier than the rear pop-up device 52, the front pop-up device 51 may be driven by a gas generator using explosive. Meanwhile, since the rear pop-up device 52 hits the protection target later than the front pop-up device 51, the rear pop-up device 52 may be driven by an actuator using a motor. Like this, the pop-up device 5 may have freedom in the configuration.

(5) Although the embodiment controls the airbag device 2 and the pop-up device 5 independently from each other using their respective programs (FIGS. 6 and 8), the systems may be controlled at the same time using a common program.

(6) The embodiment has the configuration in which the airbag 21 pushes the hood edge cover 17 upward before the airbag 21 is deployed. Meanwhile, the modification illustrated in FIG. 4B has the configuration in which the hood 11 is slightly opened before the airbag 21 is deployed. Instead, a configuration may be employed in which: a hole for the deployment is provided to the hood 11 in advance; and the airbag 21 is deployed through the hole without pushing the hood 11 upward. Otherwise, another configuration may be employed in which: the hole for the deployment is covered with a low-strength cover; and the cover is opened and the airbag 21 is deployed through the hole.

Although the embodiments of the present invention have been described and illustrated in detail, the disclosed embodiments are made for purposes of illustration and example only and not limitation. The scope of the present invention should be interpreted by terms of the appended claims.

What is claimed is:

1. A vehicular protection device comprising:
   a protection device that protects a protection target that comes into collision with a vehicle;
   a measuring device that captures an image of the protection target and measures a distance between the protection target and the vehicle; and
   a controller that activates the protection device in different modes based on whether the protection target includes a predetermined vehicle on which to ride,
   wherein
   the protection device includes an airbag device that deploys an airbag toward a front of the vehicle, and a pop-up device that moves a hood provided in a front upper section of the vehicle, and
   the controller activates the pop-up device without activating the airbag device if the protection target includes the vehicle on which to ride, and activates the airbag device and the pop-up device if the protection target does not include the vehicle on which to ride.

2. The vehicular protection device according to claim 1, wherein
   the controller
   determines a position of a center of gravity of the protection target based on information from the measuring device,
   causes the pop-up device to push the hood upward and move the hood backward if the position of the center of gravity belongs to a first range,
   causes the pop-up device to push a rear part of the hood upward if the position of the center of gravity belongs to a second range lower than the first range, and
   inactivate the pop-up device if the position of the center of gravity belongs to a third range lower than the second range.

3. The vehicular protection device according to claim 2, wherein
   the pop-up device includes a motor as a drive source, and
   the controller predicts the collision between the protection target and the vehicle based on the information from the measuring device.

4. The vehicle comprising the vehicular protection device according to claim 3.

5. The vehicular protection device according to claim 2, wherein the pop-up device includes
   a front pop-up device including a gas generator that uses explosive as a drive source, and
   a rear pop-up device including a motor as a drive source, and provided at a back of the front pop-up device.

6. The vehicle comprising the vehicular protection device according to claim 5.

7. The vehicle comprising the vehicular protection device according to claim 2.

8. The vehicular protection device according to claim 1, further comprising
   an acceleration sensor that is provided in a front end section of the vehicle and detects the collision between the vehicle and the protection target, wherein
   the pop-up device is activated by a gas generator using explosive to move a hood provided in a front upper section of the vehicle, and
   the controller activates the pop-up device based on a result of detection by the acceleration sensor.

9. The vehicle comprising the vehicular protection device according to claim 8.

10. The vehicle comprising the vehicular protection device according to claim 1.

* * * * *